(12) United States Patent
Ishizuka

(10) Patent No.: US 8,759,747 B2
(45) Date of Patent: Jun. 24, 2014

(54) ABSOLUTE ROTARY ENCODER

(75) Inventor: Ko Ishizuka, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 243 days.

(21) Appl. No.: 13/314,334

(22) Filed: Dec. 8, 2011

(65) Prior Publication Data

US 2012/0153136 A1 Jun. 21, 2012

(30) Foreign Application Priority Data

Dec. 15, 2010 (JP) ................................ 2010-279871

(51) Int. Cl.
*G01D 5/34* (2006.01)
(52) U.S. Cl.
USPC ................................ 250/231.18; 250/231.13
(58) Field of Classification Search
USPC ............. 250/231.13, 231.14, 231.16, 231.17, 250/233, 236, 231.18; 356/616, 617
See application file for complete search history.

(56) References Cited

U.S. PATENT DOCUMENTS 7,615,737 B2  11/2009 Saint Clair et al.
8,188,420 B2*  5/2012 Lee .......................... 250/231.13

FOREIGN PATENT DOCUMENTS

| JP | 60-89713 A | 5/1985 |
|---|---|---|
| JP | 2004-529344 A | 9/2004 |
| JP | 2008-539409 A | 11/2008 |
| WO | 02/084223 A1 | 10/2002 |
| WO | 2006/114619 A1 | 11/2006 |
| WO | 2007/073272 A1 | 6/2007 |

OTHER PUBLICATIONS

European Search Report issued in counterpart application No. 11191670.6, dated May 7, 2012.

* cited by examiner

*Primary Examiner* — Georgia Y Epps
*Assistant Examiner* — Don Williams
(74) *Attorney, Agent, or Firm* — Rossi, Kimms & McDowell, LLP

(57) ABSTRACT

An absolute rotary encoder comprises: a rotary member which includes a cylindrical surface on which a plurality of marks are arranged at a predetermined pitch in a circumferential direction; a light source configured to emit a light toward the cylindrical surface; a detector configured to detect a predetermined number of marks of the plurality of marks; and a computing device configured to obtain an absolute rotation angle of the rotary member based on an output from the detector. The detector is configured to output a signal corresponding to the predetermined number of marks and having an uneven period resulting from a geometrical layout of the light source, the cylindrical surface, and the detector. The computing device is configured to correct the signal using correction data so as to reduce unevenness of the period, and to obtain the absolute rotation angle of the rotary member using the corrected signal.

8 Claims, 4 Drawing Sheets

ABSOLUTE ROTARY ENCODER

BACKGROUND OF THE INVENTION

1. Field of the Invention

The present invention relates to an absolute rotary encoder.

2. Description of the Related Art

An incremental rotary encoder or absolute rotary encoder is conventionally used to measure an angle. The incremental rotary encoder radially records slits having a predetermined period on a disk, optically or magnetically reads the relative rotational movement of the slits, and computes an absolute rotation angle by combining the read result with an origin detecting mechanism. Note that many high-resolution products each of which has a slit pitch decreased to about 80 μm and interpolates a phase within one pitch by dividing the phase into about 10,000 portions by using an electrical divider are recently available. Also, the slits are normally not read one by one, but a plurality of slits are read by optically averaging them. This increases the accuracy because dust, flaws, defects, and pattern variation errors of the slits themselves are averaged. Since, however, absolute angle information cannot be obtained unless the original is initially detected, applications to particularly the fields of machine tools and robots are limited.

Various kinds of absolute encoders have been proposed as binary patterns, and a so-called gray code method of recording binary patterns on a plurality of tracks and a method of recording a random-number code on one track are available. However, the resolution of the gray code method is not so high because mounting errors make it difficult to synchronize the detection timings of pieces of information of different tracks. Accordingly, a method has been proposed by which binary codes 1 and 0 are expressed by the value of the transmittance, the value of the slit width, or the presence/absence of slits or pits arranged at equal intervals, and recorded as cyclic code patterns on one track. The cyclic code patterns are patterns in which when 1s and 0s are arranged at random, there are absolutely no portions having the same arrangement on the entire circumference in M adjacent patterns. An absolute rotary encoder described in Japanese Patent Laid-Open No. 60-89713 adopts a method using a scale board having a scale in which scale marks are repetitively formed at a predetermined pitch and the length in the repetitive direction sequentially changes by a predetermined amount.

Japanese Patent Laid-Open No. 2004-529344 has disclosed an absolute encoder using an absolute code obtained by partially removing reflective slits periodically arranged at equal intervals.

Unfortunately, unique problems arise when applying the one track type absolute encoder as described above to a rotary encoder having a scale formed on a cylindrical surface (a surface of a circular cylinder). The first problem is that when illuminating marks formed on the cylindrical surface with a light beam and detecting light reflected by the marks by a light receiving element array, the projection magnification fluctuates because a distance d between the cylindrical surface and a light projecting/receiving unit (head) changes. To solve the first problem, Japanese Patent Laid-Open No. 2008-539409 has disclosed a method of installing a sensor for detecting the value of the distance, thereby arranging the cylindrical surface and head at an appropriate distance d.

The second problem is periodic distortion. The periodic distortion is a phenomenon in which especially when a radius R of the cylindrical surface is small, the enlargement magnification increases when a light beam illuminating the peripheral portion of the cylindrical surface is projected onto a linear light receiving element array, compared to a light beam illuminating the front portion of the cylindrical surface. If this periodic distortion exists, the period of bright-and-dark patterns on the light receiving element array prolongs toward the peripheral portion. Japanese Patent Laid-Open No. 2008-539409 gives no suggestion as to this periodic distortion.

In the one track type absolute rotary encoder, a code error or phase detection (interpolation) error occurs unless the intensity and phase information of a projected pattern are accurately detected in both the central portion and peripheral portion of the light receiving element array. Conventionally, therefore, only a product in which a scale is formed on a cylindrical surface that has a relatively large R (about 50 mm) and hence is approximately regarded as a flat surface has been put to practical use.

Accordingly, an absolute rotary encoder having a scale on a cylindrical surface is required to be capable of canceling the influence of the periodic distortion, and the change in projection magnification of marks caused by the change in distance between the cylindrical surface and a head, and also capable of downsizing the cylindrical surface. In addition, to put a so-called module type encoder, in which a cylindrical surface and head are separated, to practical use, it is important to allow some tolerance to a mounting error, and include a function of outputting information indicating the mounting state is proper. Accordingly, a demand has arisen for an absolute rotary encoder including these functions.

SUMMARY OF THE INVENTION

The present invention provides, for example, an absolute rotary encoder including marks (a scale) formed on a cylindrical surface, and advantageous in measurement accuracy.

The present invention in its first aspect provides an absolute rotary encoder comprising: a rotary member which includes a cylindrical surface on which a plurality of marks are arranged at a predetermined pitch in a circumferential direction, and configured to be rotated around an axis of the cylindrical surface; a light source configured to emit a light toward the cylindrical surface; a detector including a plurality of photoelectric conversion elements arranged at a pitch smaller than the predetermined pitch, and configured to detect a predetermined number of marks of the plurality of marks; and a computing device configured to obtain an absolute rotation angle of the rotary member based on an output from the detector, wherein the detector is configured to output a signal corresponding to the predetermined number of marks of the plurality of marks and having an uneven period resulting from a geometrical layout of the light source, the cylindrical surface, and the detector, and the computing device is configured to correct the signal using correction data so as to reduce unevenness of the period, and to obtain the absolute rotation angle of the rotary member using the corrected signal.

Further features of the present invention will become apparent from the following description of exemplary embodiments with reference to the attached drawings.

DESCRIPTION OF THE EMBODIMENTS

Figure 1A:
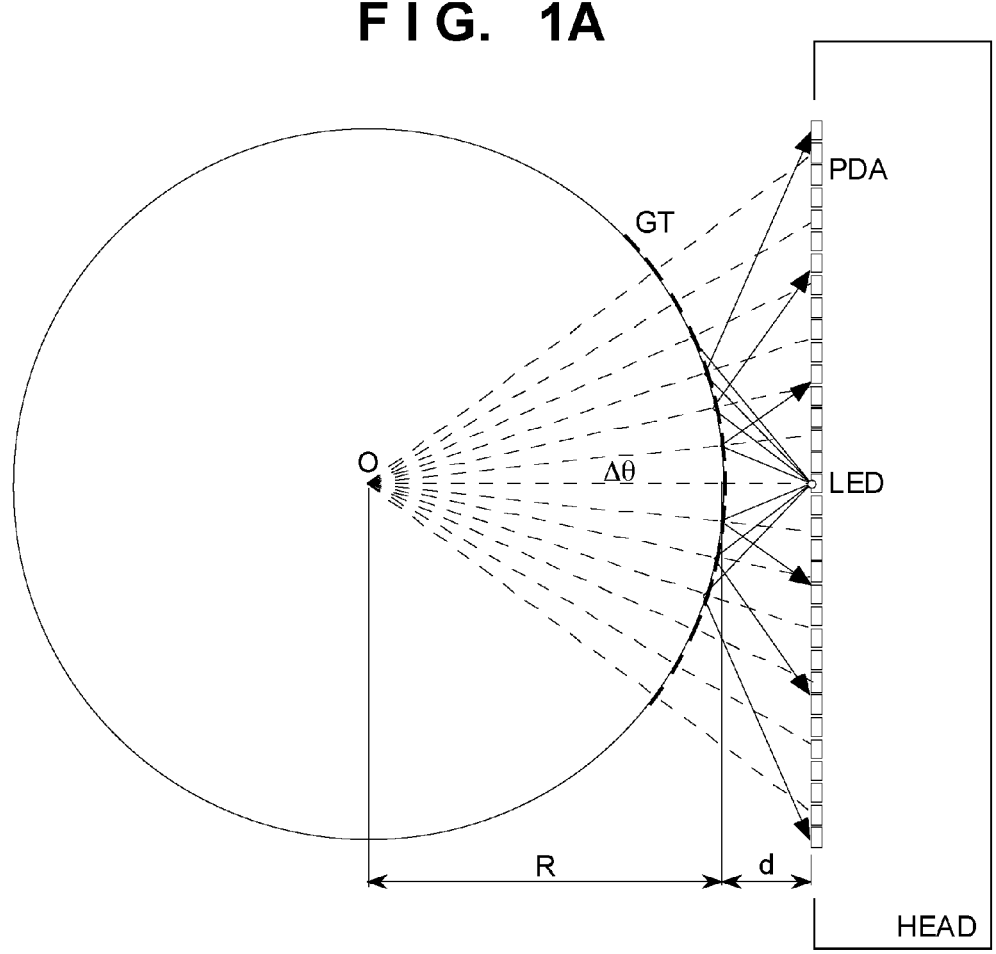
FIG. 1A is a plan view of an absolute rotary encoder.
Figure 1B:
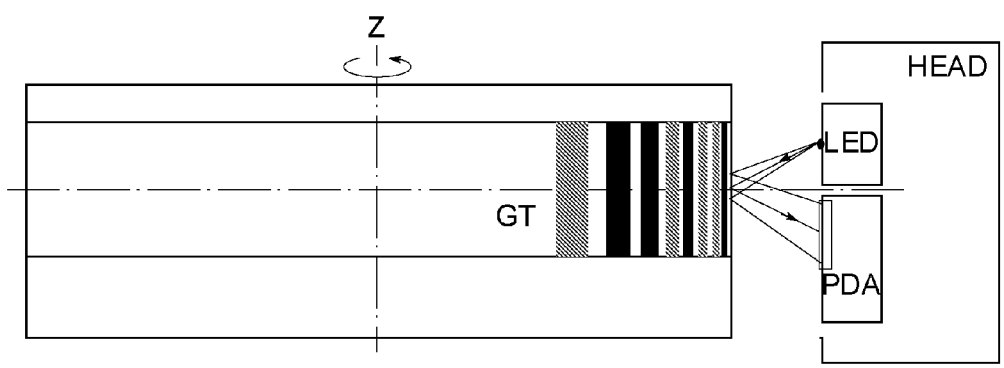
FIG. 1B is a side view of the absolute rotary encoder.
Figure 2:
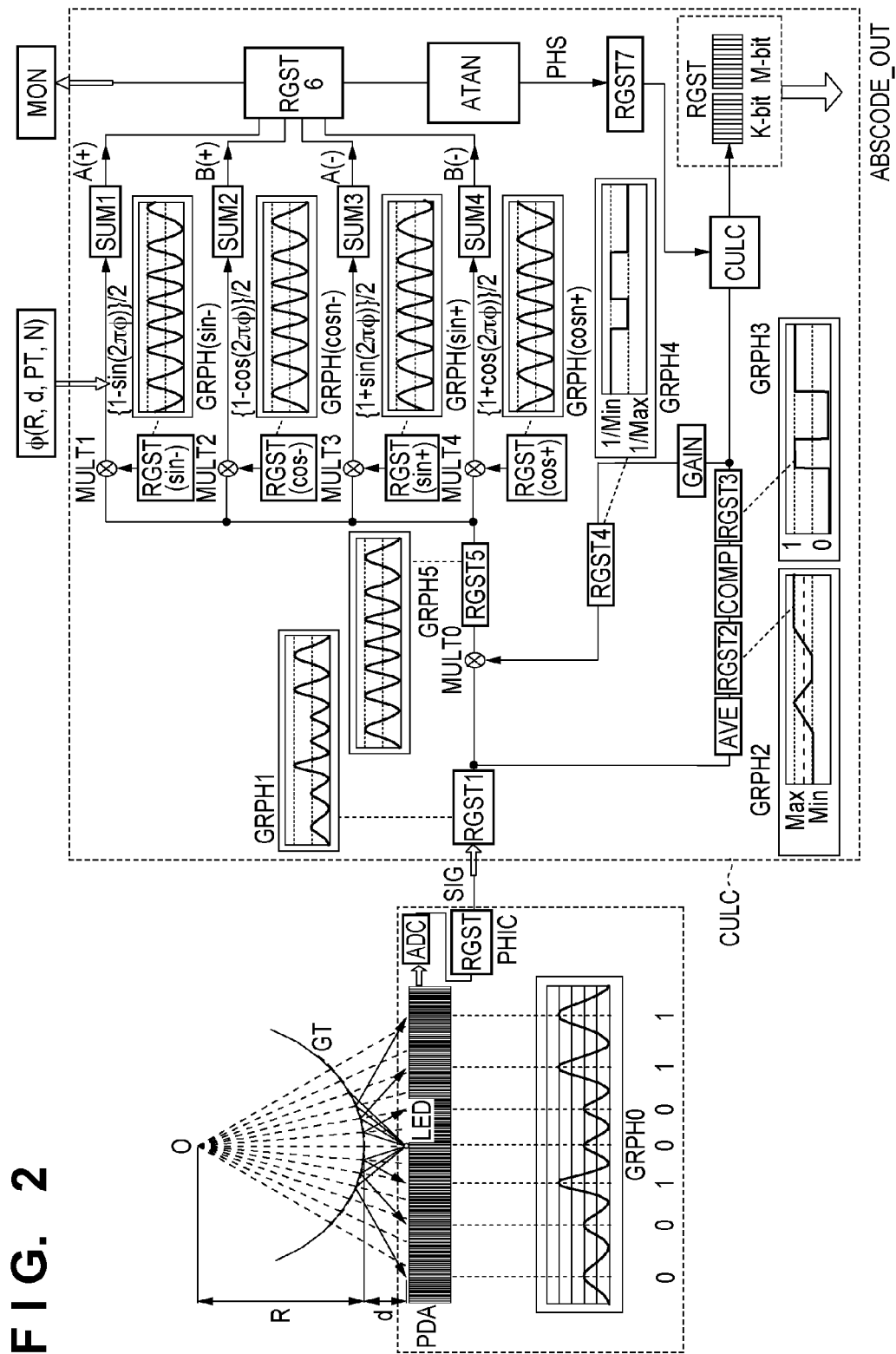
FIG. 2 is a view for explaining the procedure of signal processing of the absolute rotary encoder.

Embodiments of the present invention will be explained in detail below with reference to the accompanying drawings. FIGS. 1A and 1B are views for explaining the arrangement of an absolute rotary encoder including a cylindrical member GT having a plurality of marks formed on a cylindrical surface. FIG. 2 is a view for explaining the procedure of signal processing. As shown in FIG. 1A, a head is placed at a distance d from the cylindrical surface having a radius R. The head includes a light source (a point light source LED) for emitting light toward the cylindrical surface, and a detector (a light receiving element array PDA) for detecting light reflected by the marks arranged on the cylindrical surface.

The cylindrical member GT rotates around a central axis O of the cylindrical surface with respect to the head. Non-reflective slits are radially arranged at equal intervals on the cylindrical surface, and reflective slits or partially reflective slits are arranged between the non-reflective slits at a predetermined period in the circumferential direction. The reflective slits and partially reflective slits form a plurality of marks to be detected by the light receiving element array PDA. It is of course also possible to radially arrange reflective slits at equal intervals on the cylindrical surface, and arrange non-reflective slits or partially reflective slits between the reflective slits at a predetermined period in the circumferential direction, thereby forming a plurality of marks by the non-reflective slits or partially reflective slits. The partially reflective slits can be implemented by forming thin films on the reflective slits, reducing the size of the reflective slits, or partially shielding the reflective slits by using hatching patterns or the like, and any method can be used as long as the reflected light amount can be reduced. FIG. 1A schematically shows the reflective slits and partially reflective slits forming the marks by thick lines. Although FIGS. 1A and 1B do not illustrate details, the value of the reflected light amount of the slits corresponds to that of the amplitude of a periodic signal of the light receiving element array PDA.

In this embodiment, the two types of slits, that is, the reflective slits and partially reflective slits form two types of marks, and an M-bit absolute code is formed by arranging a plurality of the two types of marks. In this embodiment, the two types of marks have the same shape and different reflectances, and each of the two types of marks has a uniform reflectance in the mark. The light receiving element array PDA includes a plurality of photoelectric conversion elements arranged at a pitch smaller than a mark period. The plurality of photoelectric conversion elements detect a predetermined number of marks (reflective slits and partially reflective slits) of the plurality of marks formed on the cylindrical surface. GRPH0 shown in FIG. 2 indicates the bright-and-dark distribution of incident light to the light receiving element array PDA. The photoelectric conversion elements of the light receiving element array PDA output a plurality of mark signals corresponding to the brightness and darkness as electrical signals. In this embodiment, the plurality of electrical signals output from the light receiving element array PDA are temporarily stored in a register, and serially transferred by using an externally applied clock signal as a trigger.

A serially transferred signal waveform GRPH1 is the same as GRPH0 indicating the light amount distribution entering the light receiving element array PDA. The signal waveform GRPH1 is shown as a sine waveform in which the period is narrow in the central portion and wide in the peripheral portion, and which has an amplitude modulated by the absolute code. However, the actual waveform becomes a triangular wave or trapezoidal wave due to the fluctuations in distance between the cylindrical surface and light receiving element array PDA, that is, the sine wave is distorted. The output waveform from the light receiving element array PDA will be handled as "waveform data" corresponding to the number of effective channels of the light receiving element array PDA, and a computing device CULC to be described below converts "waveform data" one after another.

Signal processing performed by the computing device CULC for calculating the absolute rotation angle of the cylindrical member GT will be explained with reference to FIG. 2. The computing device CULC computes the absolute rotation angle of the cylindrical member GT at the position of the light receiving element array PDA based on the serially transferred waveform GRPH1 output from the light receiving element array PDA. Reflected light components from the slits of the cylindrical surface are projected as bright-and-dark patterns onto the light receiving element array PDA. However, the region of a predetermined number of marks on the cylindrical surface is distorted when projected onto the light receiving element array PDA, due to the geometrical layout of the light source LED, cylindrical surface, and light receiving element array PDA. Consequently, the spacings between the bright-and-dark patterns increase from the central portion to the peripheral portion of the light receiving element array PDA. Also, the phases of the bright-and-dark signals output from the photoelectric conversion elements of the light receiving element array PDA are shifted from each other. That is, the signals of the predetermined marks detected by the light receiving element array PDA have an uneven period.

This phase shift (correction data) indicating the unevenness of the patterns projected onto the light receiving element array PDA can be computed in advance by using parameters pertaining to the geometrical layout of the light source LED, cylindrical surface, and light receiving element array PDA. The computing device CULC corrects the output from each photoelectric conversion element by using this phase shift data, so as to reduce the unevenness of the period. The parameters pertaining to the geometrical layout include the radius R of the cylindrical surface, the distance d from the cylindrical surface to the point light source and light receiving element array, a photoelectric conversion element number N (expressed by ± from 0 as the central portion), a pitch PT of the light receiving element array, and the number of slits formed on the cylindrical surface/circumference U. Assume that a reference phase φ of a bright-and-dark pattern entering the Nth photoelectric conversion element is expressed by a function φ(N). When a slit formed in the cylindrical surface is positioned at the front when viewed from the head, the reference phase of the bright-and-dark pattern of the slit is defined as zero. That is, when the phase is zero, the reflected light amount entering the photoelectric conversion element number No. 0 becomes maximal.

Figure 3A:
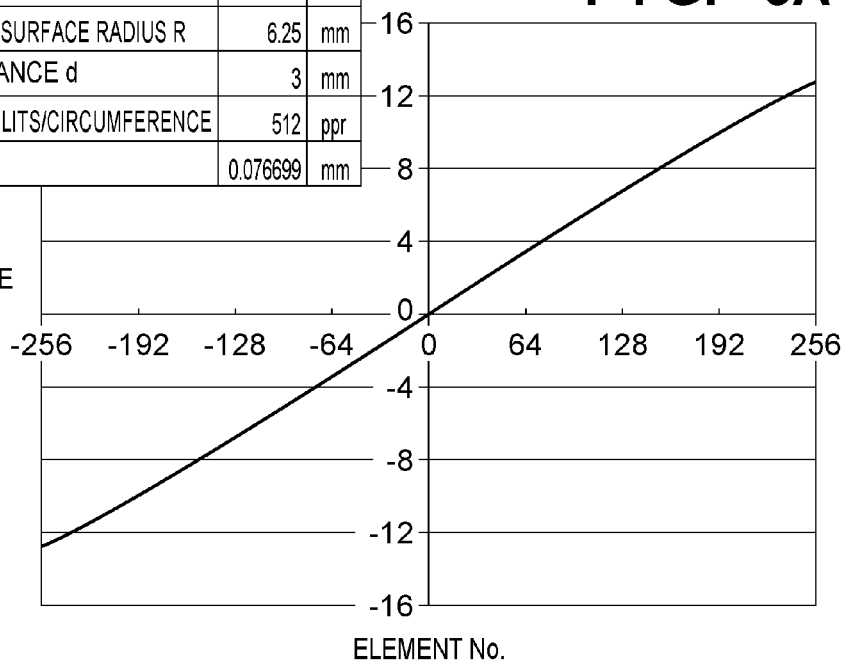
FIGS. 3A and 3B are graphs showing the relationship between the radius of a cylindrical surface and a projected phase on a light receiving element array.

Assuming that PT=0.0125 mm, R=6.25 mm, d=3 mm, and U=512 as shown in FIG. 3A, the pitch of the slits on the circumference of the cylindrical surface is about 0.077 mm. In this state, the reference phase φ of a pattern corresponding to the photoelectric conversion element number is as shown in FIG. 3A. Note that the abscissa represents the photoelectric conversion element number, and the ordinate represents the phase φ. The graph is not a straight line but a curved line. The number of slits in the cylindrical surface in this calculation example is U=512=2^9, that is, the number of bits is nine, so it is only necessary to correctly receive bright-and-dark patterns of a region of nine periods. Since, however, information of bright-and-dark patterns before and after this region is necessary in the calculation of a phase, data of a region of ±one period is additionally used. Accordingly, a register RGST(sin+) shown in FIG. 2 holds the value of the reference phase of a region where $\phi=\pm5.5$ on the ordinate of FIG. 3A. Also, a register RGST(sin−) holds a value obtained by adding a half period, that is, +0.5 to this reference phase. A register RGST(cos+) holds a value obtained by adding a ¼ period, that is, +0.25 to this reference phase. A register RGST(cos−) holds a value obtained by adding a ¾ period, that is, +0.75 to this reference phase.

Figure 3B:
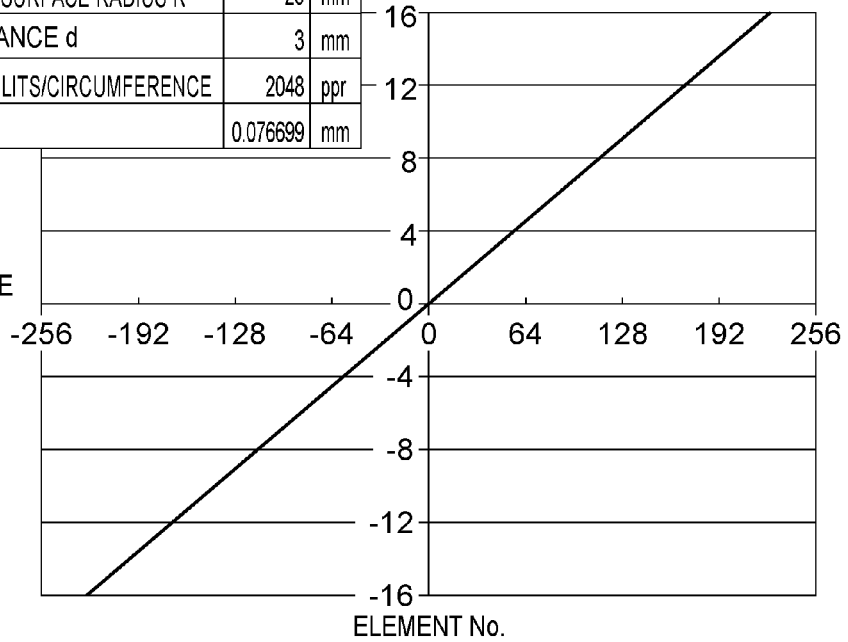

Assuming that PT=0.0125 mm, R=25 mm, d=3 mm, and U=2048 as shown in FIG. 3B in another example, the pitch of the slits in the cylindrical surface is about 0.077 mm, that is, the same as before. In this state, the reference phase $\phi$ of a pattern corresponding to the photoelectric conversion element number is as shown in FIG. 3B. Note that the abscissa represents the photoelectric conversion element number, and the ordinate represents the phase $\phi$. The graph is close to a straight line but slightly curved. Also, the slope is different from that shown in FIG. 3A. The number of slits in the cylindrical surface in this calculation example is U=2048=2^11, that is, the number of bits is eleven, so it is only necessary to correctly receive bright-and-dark patterns of a region of eleven periods. Since, however, information of bright-and-dark patterns before and after this region is necessary in the calculation of a phase, data of a region of ±one period is additionally used. Accordingly, the register RGST (sin+) shown in FIG. 2 holds the value of the reference phase of a region where $\phi=\pm6.5$ on the ordinate of FIG. 3B. Also, the register RGST(sin−) holds a value obtained by adding +0.5 to this reference phase, the register RGST(cos+) holds a value obtained by adding +0.25 to this reference phase, and the register RGST(cos−) holds a value obtained by adding +0.75 to this reference phase.

An operation unit AVE computes a sum signal of each photoelectric conversion element and surrounding photoelectric conversion elements in a region where the relative phase is ($-\pi$ to $+\pi$), converts the sum signal into a waveform GRPH2, and stores a maximum value Max and minimum value Min of the waveform. In addition, a comparator COM quantizes (binarizes) the waveform GRPH2 computed by the operation unit AVE by the intermediate intensity, thereby converting the waveform GRPH2 into a data string GRPH3. This data string is a temporary integer part of the absolute code. The computing device CULC converts a first temporary absolute code into first angle data whose minimum unit is the mark period.

Furthermore, an operation unit GAIN generates gain correction data GRPH4, and a multiplier MULT0 multiplies the waveform data GRPH1 obtained from the light receiving element array PDA by the gain correction data GRPH4. This multiplication removes the influence of amplitude modulation of the absolute code, thereby generating waveform data GRPH5 having a normalized amplitude.

The waveform data GRPH5 is divided into four signals. The first divided signal is multiplied by waveform data $\{(1-\sin 2\pi\phi)/2\}$ held in the register RGST(sin−). The second divided signal is multiplied by waveform data $\{(1-\cos 2\pi\phi)/2\}$ held in the register RGST(cos−). The third divided signal is multiplied by waveform data $\{(1+\sin 2\pi\phi)/2\}$ held in the register RGST(sin+). The fourth divided signal is multiplied by waveform data $\{(1+\cos 2\pi\phi)/2\}$ held in the register RGST (cos+). The computation of the total sum of these elements generates four-phase signals (voltages) A(+), B(+), A(−), and B(−) having a phase difference of 90° in a so-called incremental encoder.

An arctangent operation ATN is performed (or a table is looked up by division) by using a difference signal between the total sum signals A(+) and A(−) and a difference signal between the total sum signals B(+) and B(−). This makes it possible to compute a phase PHS of a periodic signal having a resolution equal to that of a so-called incremental encoder. Note that $\phi$ is equivalent to a value obtained by dividing, by $2\pi$, a phase in which the serially transferred waveform moves by one bright-and-dark period. Even when the original sine waveform output from the light receiving element array PDA itself is close to a triangular wave or is a trapezoidal wave, information of the phase PHS has a very high accuracy; the phase can normally be interpolated by dividing it into 1,000 or more portions. For example, when the value obtained by the arctangent operation is stored in a K-bit register RGST7, the phase PHS of the periodic signal as an interpolation unit can be expressed by K bits. From information of at least one phase PHS of the periodic signal having the normalized amplitude, the computing device CULC computes second angle data having the resolution of the length of a segment obtained by dividing the mark period, and having a minimum unit smaller than that of the first angle data.

A method of generating an M-bit integer part of the absolute code from the temporary integer part of GRPH3 will be explained. First, letting $\theta$ be a value obtained by converting the phase PHS of the periodic signal into a value below the decimal point of a decimal number, assume that the phase PHS has the value of a region where $0\le\theta<1$. FIGS. 4A to 4F show regions of seven bits (seven bright-and-dark periods) when the slits formed in the cylindrical surface rotationally move in one direction and the value of $\theta$ fluctuates by 0.25 at one time. Two graphs at six values of $\theta$ shown in FIGS. 4A to 4F are a graph (equivalent to GRPH1 shown in FIG. 2) of the light receiving element array output waveform, and a graph (equivalent to GRPH3 shown in FIG. 2) of the temporary integer part. 0 or 1 is shown below a value obtained by selecting a photoelectric conversion element having a reference phase equivalent to the value of $\theta$, and extracting data from the selected element.

Figure 4A:
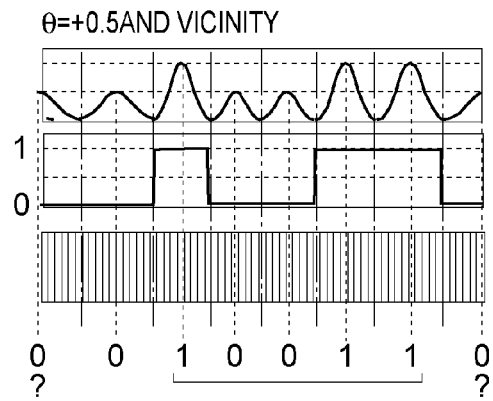
FIGS. 4A to 4F are views for explaining the way the integer part of an absolute code is determined.
Figure 4B:
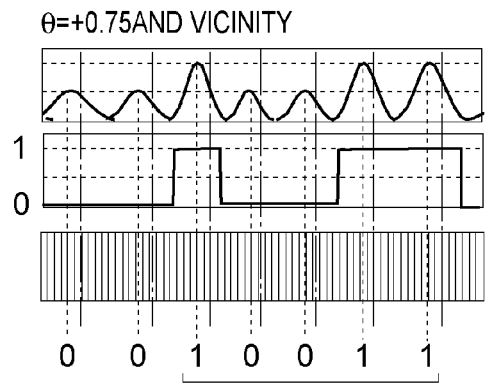
Figure 4C:
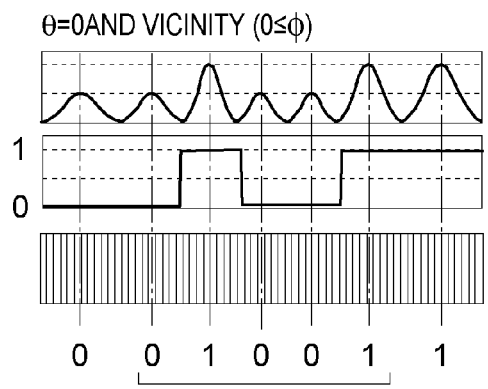
Figure 4D:
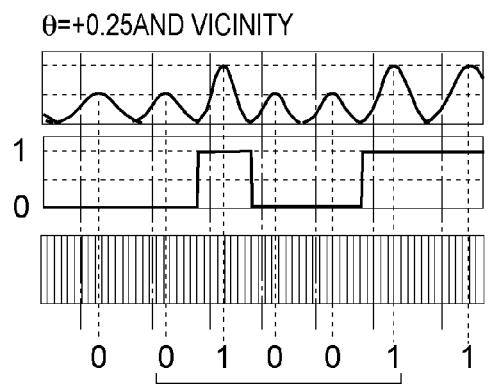
Figure 4E:
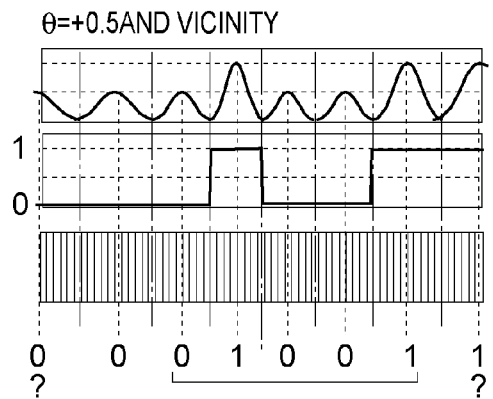
Figure 4F:
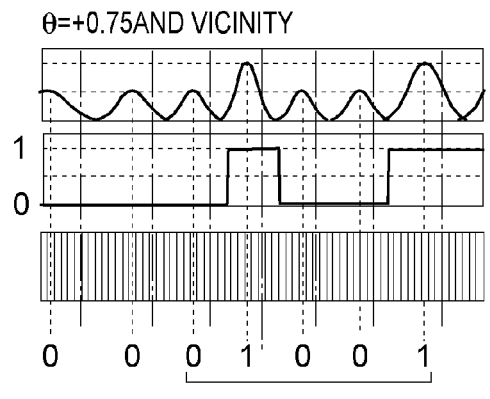

When $0\le\theta<0.5$ as shown in FIGS. 4C and 4D, a code "01001" is adopted by discarding the first and seventh bits of the seven-bit data. When $0.5\le\theta<1$ as shown in FIG. 4E, a code "01001" is adopted by discarding the upper two bits of the seven-bit data.

FIGS. 4A and 4B each illustrate a case in which the slits have moved in the opposite direction from FIG. 4C. Since $0.5\le\theta<1$, therefore, a code "10011" is adopted by discarding the upper two bits of the seven-bit data. Note that when the phase is zero in FIG. 4C, the code is the immediately preceding code because the sign is negative. Although this acquisition rule is an example, a true M-bit integer part of the absolute code can be determined, based on the phase $\theta$ of the interpolation unit, by extracting data from the temporary integer part in accordance with a defined rule and arranging the extracted data.

The finally output M-bit integer part can be a cyclic code recorded on the slits formed in the cylindrical surface, but this M-bit integer part is desirably converted into a general binary code. The computing device CULC generates data representing the absolute rotation angle of the cylindrical member GT by combining an M-bit integer part M-CODE obtained as described above and a K-bit interpolation unit K-CODE, and outputs the data as a serial signal.

The above operation holds when the geometrical layout of the head and cylindrical surface, which is adopted as the basis of the computation of the period unevenness correction data, is equal to the designed reference value. In practice, however, the distance d (relative position) between the head and cylindrical surface is not equal to the designed reference value, but has an error. Whether this error of the distance d between the head and cylindrical surface falls within an allowable range can be determined by using a signal of a predetermined number of marks corrected by the computing device CULC. This embodiment uses the square-sum of the four-phase signals (A+, B+, A−, and B−) equivalent to a four-phase incremental encoder, which is stored in a register RGST6 shown in FIG. 2, as the corrected mark signal to be used to determine whether the error falls within the allowable range. For example, the degree of the error can be indicated by a method in which a light emitting diode (LED) is continuously ON if the value of the square-sum of the four-phase signals (A+, B+, A−, and B−) is equal to or larger than a defined value, flickers if the value is slightly smaller than the defined value, and is not turned on if the value is further smaller than the defined value. It is of course also possible to directly output the value of the square-sum from an output terminal.

If the error is large, the computing device CULC repetitively executes the processes of changing the value of the distance, correcting the value of the unevenness of the period by using the changed value of the distance, and correcting the mark signal by using the corrected value of the unevenness, until the error falls within the allowable range. More specifically, the computing device CULC changes the waveform data in the registers RGST(sin−), RGST(cos−), RGST(sin+), and RGST(cos+) by changing the value of the distance d, checks the value of the square-sum as the result, and changes the distance d such that the value of the square-sum becomes maximal. This makes automatic signal detection in an optimum state possible. That is, a stable operation can be performed even if an arrangement error occurs in the distance between the head and cylindrical surface when they are arranged. As a consequence, an absolute rotary encoder having a high tolerance to an arrangement error can be implemented.

In this embodiment, it is possible to cancel the influence of the unevenness of the mark period caused because a mark region is distorted when projected onto the detector. This makes it possible to increase the measurement accuracy of an absolute rotary encoder including a cylindrical surface having a desired diameter from a large diameter to a small diameter. In addition, information indicating whether the distance between the cylindrical surface and head is appropriate can be obtained. Accordingly, the head can easily be corrected to a proper position with respect to the cylindrical surface.

OTHER EMBODIMENTS

The present invention is not limited to the constitution of the above-mentioned embodiment, and various modifications and changes can be made without departing from the spirit and scope of the invention. In the aforementioned embodiment, the slits are formed on the outside of the cylindrical surface, and the head is placed outside the cylindrical surface. However, it is also possible to form the slits on the inside of the cylindrical surface, and place the head inside the cylindrical surface. In this case, the bright-and-dark period gradually decreases toward the peripheral portion, that is, in the opposite direction to that in the above-described embodiment. Accordingly, the phases output from the light receiving elements are shifted at unequal intervals. This problem is solved by the same method as that of the above-mentioned embodiment.

In the above embodiment, the non-reflective slits are arranged at equal intervals, and the reflective slits or partially reflective slits are arranged between them, thereby embedding an absolute code. However, it is also possible to arrange totally reflective slits at equal intervals, and arrange non-reflective slits or partially reflective slits between them, thereby embedding an absolute code. The light amount distribution in this case is the vertical inversion of the waveform GRPH0, so the binarization process and the like need only be changed accordingly.

In the above embodiment, the reflected light amount has two values of 100% and 50%. However, it is also possible to use a cyclic code in which the reflected light amount has other values, for example, 100% and 70%, or has four values, for example, 100%, 75%, 50%, and 25%. In this case, information having two or more bits can be embedded per slit. Furthermore, the light receiving element array PDA can include photoelectric conversion elements equal in number to bright-and-dark patterns larger in number than the bits of an absolute code, and perform computation by receiving signals. In this case, a so-called "incremental encoder slit averaging effect" of a periodic signal increases, and the accuracy further increases. It is also possible to apply a method of reducing the influence of a partial read error by appropriate signal processing (a method of increasing the redundancy).

In the above-mentioned embodiment, the distance d between the light source (light emitting element) LED and cylindrical surface is equal to the distance d between the cylindrical surface and light receiving element array PDA. However, the constitution of the present invention holds even when departing from this condition. In this case, however, it should be noted that the projection magnification changes. Also, the present invention can be modified into a transmissive encoder configured to receive light transmitted through marks formed on the cylindrical surface. In this case, the light emitting element LED and light receiving element array PDA need only be separately arranged inside and outside the cylindrical surface. Note, however, that the projection magnification changes.

In this embodiment, as shown in FIG. 2, the computing device CULC holds the reference phase waveforms in the four registers, and multiplies them by the periodic signal (having the normalized amplitude) obtained from the light receiving element array PDA, thereby generating four-phase phase difference signals equal to those of an incremental encoder. However, a similar function may also be implemented by using another algorithm or procedure. Examples are a method of performing addition, subtraction, and multiplication on a signal from the light receiving element array by using a parallel analog circuit, a method of performing addition, subtraction, and multiplication or a filtering process by using a serial analog circuit, and a method of immediately performing AD conversion on a signal from the light receiving element array and performing computation on the obtained digital information by FPGA or the like. In this embodiment, diverging light directly illuminates the slits in the cylindrical surface. However, it is also possible to modify the projection optical system, for example, emit parallel light by collimating the diverging light, or collimate the diverging light in only one direction by using a cylindrical lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279871 filed Dec. 15, 2010, which is hereby incorporated by reference herein in its entirety.

What is claimed is:

1. A rotary encoder comprising:
a rotary member which includes a cylindrical surface on which a plurality of marks are arranged in a circumferential direction, and configured to be rotated around an axis of the cylindrical surface;
a light source configured to emit a light toward the cylindrical surface;
a detector including a plurality of photoelectric conversion elements, and configured to detect marks of the plurality of marks with the light emitted from the light source; and
a signal processor configured to obtain a rotation angle of the rotary member based on an output from the detector,
wherein the detector is configured to output periodic signals with a plurality of periods, corresponding to the marks of the plurality of marks, and being uneven due to a geometrical layout of the light source, the cylindrical surface, and the detector, and
the signal processor is configured to obtain the rotation angle based on the output periodic signals and a reference periodic signal with the uneven plurality of periods and with a reference phase.

2. The encoder according to claim 1, wherein the light source is a point light source.

3. The encoder according to claim 1, wherein the plurality of marks include a plurality of types of marks and are arranged with a space therebetween and with a period in the circumferential direction, and the signal processor is configured:
to generate a data string by performing processing including quantization for the output periodic signals with respect to each of the plurality of periods, and to obtain first angle data based on the data string,
to obtain a phase of the output periodic signals based on the output periodic signals and the reference periodic signals, and to obtain second angle data based on the obtained phase, and
to generate an absolute rotation angle of the rotary member based on the first angle data and the second angle data.

4. The encoder according to claim 3, wherein the processing includes summing of the output periodic signals with respect to each signal thereof over a period of the plurality of periods before the quantization.

5. The encoder according to claim 1, wherein the signal processor is configured to determine whether the geometrical layout falls within an allowable range based on the output periodic signals and the reference periodic signals.

6. The encoder according to claim 5, wherein the signal processor is configured, if it is determined that the geometrical layout falls outside the allowable range, to change the geometrical layout, and to change the reference periodic signals based on the changed geometrical layout.

7. The encoder according to claim 1, wherein the encoder is configured so that the plurality of photoelectric conversion elements detect light emitted from the light source and reflected by the marks of the plurality of marks.

8. The encoder according to claim 1, wherein the encoder is configured so that the plurality of photoelectric conversion elements detect light emitted from the light source and transmitted through the marks of the plurality of marks.

* * * * *